(12) United States Patent
Adams

(10) Patent No.: US 7,036,871 B2
(45) Date of Patent: May 2, 2006

(54) REAR WING FOR A MOTOR VEHICLE

(75) Inventor: Stefan Adams, Leonberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 28 days.

(21) Appl. No.: 10/901,034

(22) Filed: Jul. 29, 2004

(65) Prior Publication Data

US 2005/0029835 A1 Feb. 10, 2005

(30) Foreign Application Priority Data

Aug. 9, 2003 (DE) ................. 103 36 664

(51) Int. Cl.
*B62D 35/00* (2006.01)
(52) U.S. Cl. .................. 296/180.1; 180/903
(58) Field of Classification Search ............ 296/180.1, 296/180.2, 180.3, 180.5; 180/903
See application file for complete search history.

(56) References Cited

U.S. PATENT DOCUMENTS

| | | | |
|---|---|---|---|
| 4,558,898 A * | 12/1985 | Deaver ................. | 296/180.1 |
| 5,240,536 A | 8/1993 | Kurobe | |
| 5,356,195 A * | 10/1994 | Kanda ................. | 296/180.1 |
| 6,170,904 B1 * | 1/2001 | Schaedlich et al. ...... | 296/180.1 |
| 6,293,613 B1 * | 9/2001 | Choi .................. | 296/180.1 |

FOREIGN PATENT DOCUMENTS

| | | | |
|---|---|---|---|
| DE | 3528569 A1 * | 2/1987 | |
| DE | 100 02 511 | 8/2001 | |
| JP | 02200581 A * | 8/1990 | |
| JP | 06024362 A * | 2/1994 | |
| WO | WO 97/32770 | 9/1997 | |

* cited by examiner

*Primary Examiner*—Patricia L. Engle
(74) *Attorney, Agent, or Firm*—Crowell & Moring LLP

(57) ABSTRACT

A rear wing for a motor vehicle has a wing roof and a wing bottom formed as a hollow body. A reinforcing structure is arranged inside the hollow body and has several upright webs, of which at least one cross web extending in a transverse direction of the vehicle is connected with the interior surface of the wing bottom. At least one drainage opening is provided in the wing bottom. In order to be able to drain water penetrating into the hollow body, the at least one cross web has a plane web surface which forms a wall of a water channel, and the at least one opening is arranged in the course of the water channel.

30 Claims, 3 Drawing Sheets

# REAR WING FOR A MOTOR VEHICLE

BACKGROUND AND SUMMARY OF THE INVENTION

This application claims the priority of German Application No. 103 36 664.4-21 filed Aug. 9, 2003, the disclosure of which is expressly incorporated by reference herein.

The invention relates to a rear wing spoiler for a motor vehicle. Preferred embodiments of the invention relate to a vehicle rear wing for a motor vehicle passenger car, comprising a hollow body assembled of at least two parts having a wing roof and a wing bottom, a reinforcing structure arranged inside the hollow body and having several upright webs, of which at least one cross web extending in a transverse direction of the vehicle is connected with an interior surface of the wing bottom, and at least one opening provided in the wing bottom.

A type-forming rear wing is contained in DE 100 02 511 A1. It is implemented as a hollow body which, in two parts, is composed of an upper and a lower part forming a wing roof and a wing bottom. Viewed in the driving direction, a forward section of the joining surface between the upper and the lower part is situated on a forward front side of the rear wing. The upper and the lower part are fastened to one another by a screwed connection. The rear wing also has a reinforcing structure arranged inside the hollow body, which reinforcing structure has a cross web extending in the transverse direction of the vehicle. Diagonal webs aligned in a V-shape at the two web surfaces and longitudinal webs extending approximately in the longitudinal direction of the vehicle and situated between the diagonal webs originate from the cross web. At a lateral distance from the reinforcing structure, openings are in each case provided at the two lateral ends of the hollow body in the wing bottom, which openings are penetrated by one coupling rod respectively which is used for operating a wing flap arranged inside the hollow body.

It is an object of the invention to provide a rear wing of the generic type, in the case of which water possibly penetrating into the hollow body can be drained off.

According to the invention, this object is achieved by means of a rear wing for a motor vehicle comprising a hollow body assembled of at least two parts having a wing roof and a wing bottom, a reinforcing structure arranged inside the hollow body and having several upright webs, of which at least one cross web extending in a transverse direction of the vehicle is connected with an interior surface of the wing bottom, and at least one opening provided in the wing bottom, wherein the at least one cross web has a web surface which forms a wall of a water channel, and wherein the at least one opening is situated in a course of the water channel.

Important advantages achieved by means of the invention are that water penetrating into the hollow body during the driving operation of the motor vehicle is first collected at the cross web with the plane web surface and is drained out of the hollow body by way of the opening which is situated in the course of the water channel and penetrates the lower wing wall, whereby the undesired accumulation of water in the hollow body is avoided or reduced and a targeted guidance of water is achieved inside the hollow body. This is achieved particularly in that the web surface is plane and thus no diagonal or longitudinal webs originate from this web surface and, as a result, a continuous water channel is provided which is used for the targeted guiding of water. In addition, it is advantageous that no special demands with respect to tightness are made on the joining surface between the two parts of the hollow body, so that the rear wing according to the invention can be assembled in a simple and cost-effective manner.

Additional further developments of the invention, which advantageously influence the guidance of water to the opening within the hollow body, are described below and in the claims.

In the following, the invention will be explained in detail by means of embodiments with respect to the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
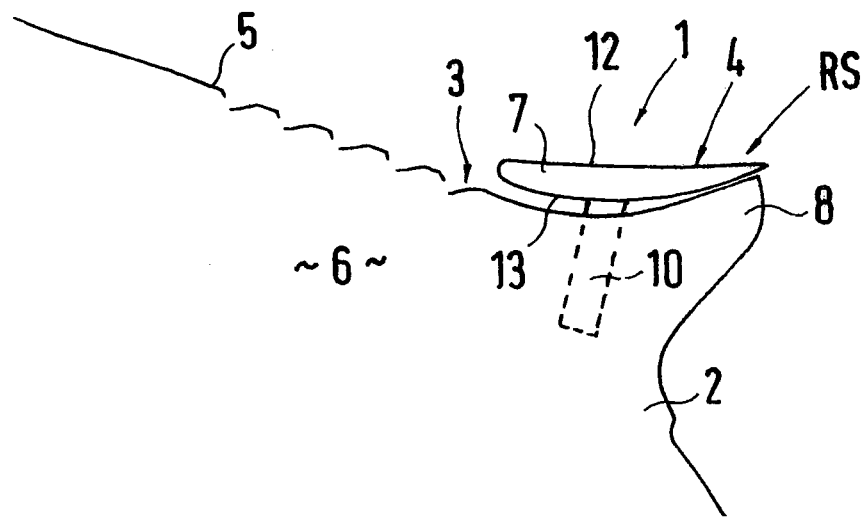
FIG. 1 is a cutout-type view of a motor vehicle having an air guiding device arranged on a rearward structure with a rear wing in the inoperative position.
Figure 2:
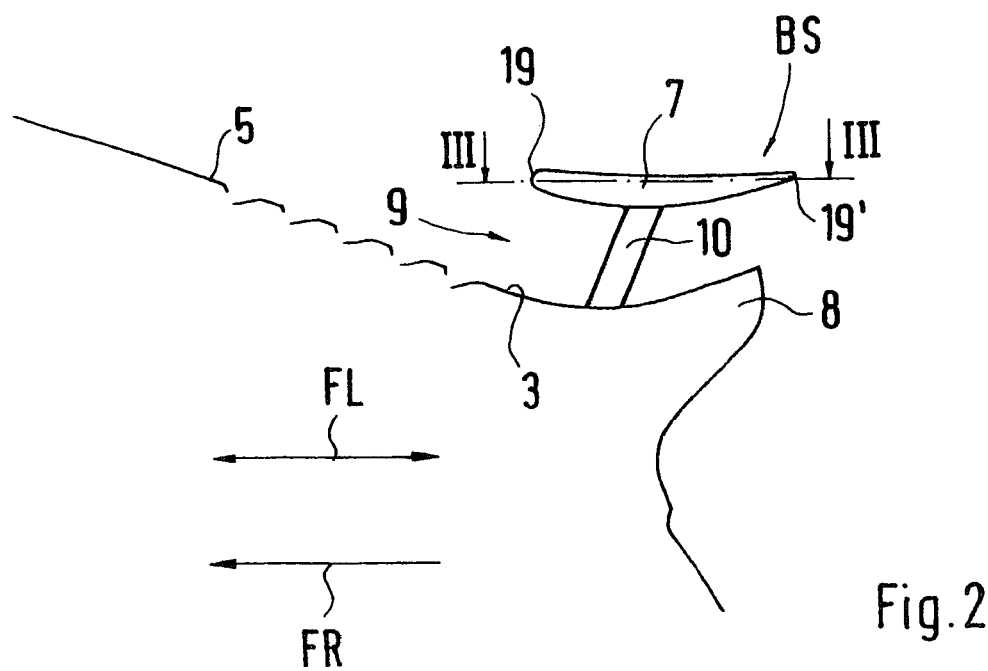
FIG. 2 is a view of the air guiding device according to FIG. 1 with the rear wing moved out into the operative position.

FIGS. 1 and 2 show a rearward structure 2 of a motor vehicle 1, particularly a passenger car, schematically illustrated in a lateral view, on whose upper side 3 an air guiding device 4 is arranged which has an aerodynamic effect and/or develops a visual effect and which has at least one rear wing 7 protruding over the outer skin 5 of the body 6 of the motor vehicle. The air guiding device 4 is preferably constructed as a so-called slotted wing and therefore, in addition to the rear wing 7, also comprises a stationary rear spoiler 8 situated below the rear wing 7. The rear wing 7 can preferably be moved from a retracted inoperative position RS illustrated in FIG. 1 into an operative position BS illustrated in FIG. 2, whereby a gap 9 is created between the rear wing 7 and the stationary rear spoiler. With respect to the vehicle body 6, the rear wing 7 is supported by way of, for example, two supports of which only one support 10 is shown, which supports a tilt-out device (not shown) for extending the rear wing 7. In another embodiment, in the position illustrated in FIG. 2, the rear wing 7 may be connected with the vehicle body in a stationary and immobile manner.

Figure 3:
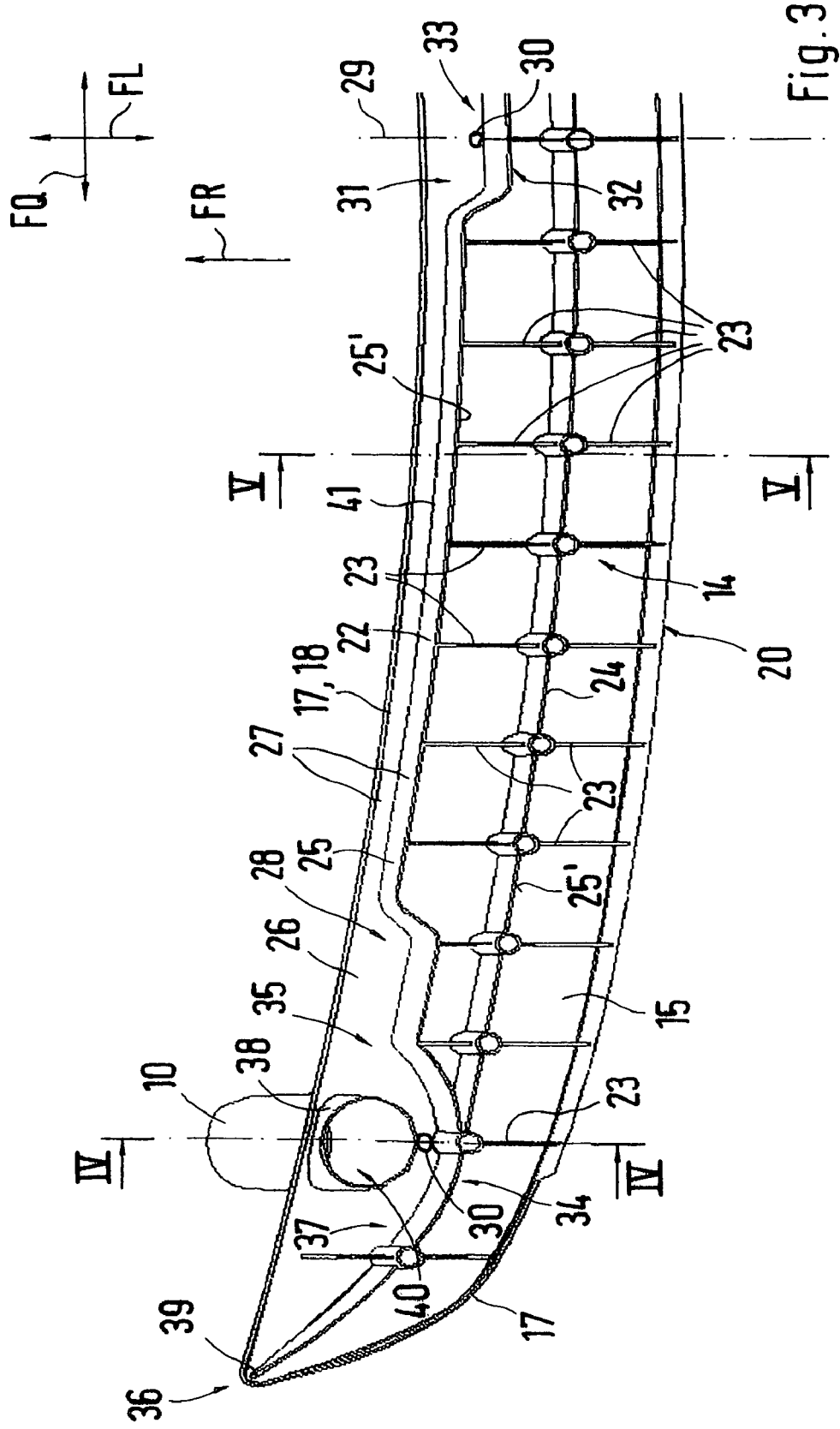
FIG. 3 is a sectional view of the rear wing along the section Line III—III in FIG. 2.
Figure 4:
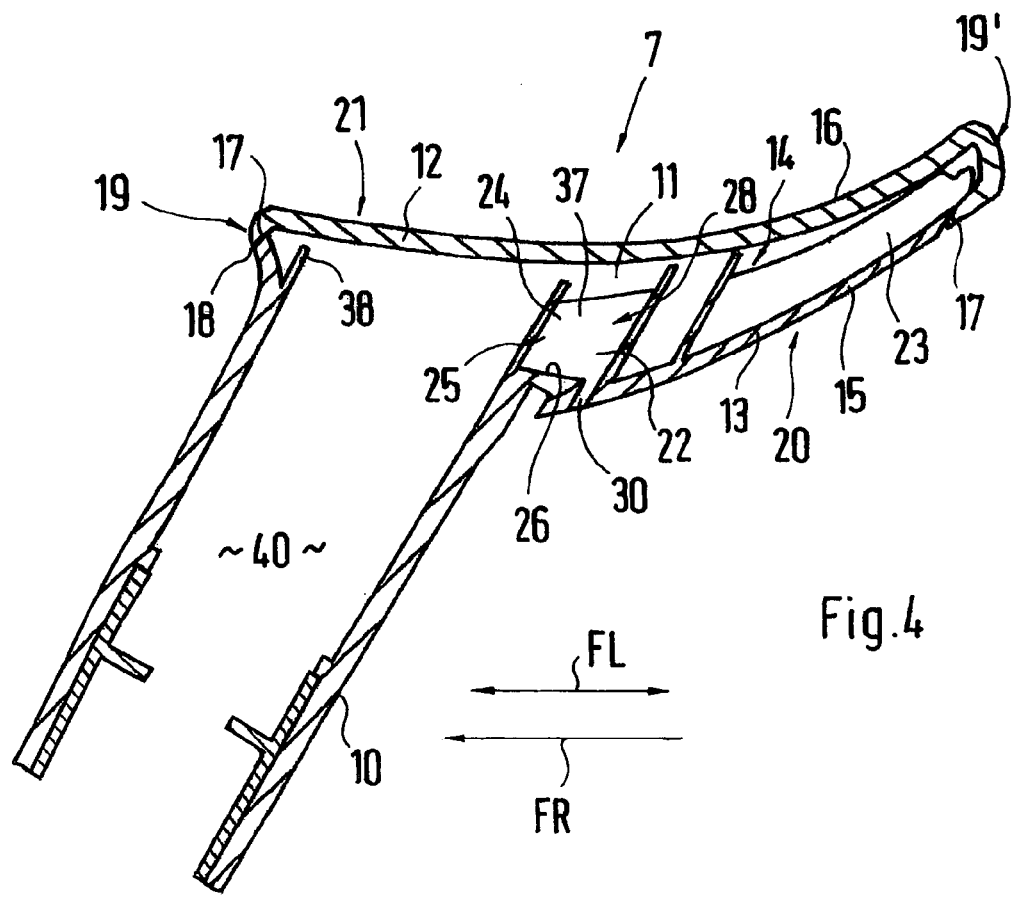
FIG. 4 is a sectional view of the rear wing along the section Line IV—IV in FIG. 3.

By means of FIGS. 3 and 4, the rear wing 7 is described in detail which is constructed as a hollow body 11, has an upper wing roof 12 as well as a lower wing bottom 13 and, in addition accommodates an interior reinforcing structure 14. The hollow body 11 is constructed in at least two parts. The parts 15 and 16 are joined to form the hollow body 11 and adjoin one another in a surrounding joining surface 17, which joining surface 17 has at last one—viewed in the driving direction FR—forward section 18 which rests against a forward front side 19 of the rear wing 7. Part 15 is implemented as a bottom shell 20 and part 16 is implemented as a top shell 21 of the hollow body 11. The bottom shell 20 has the wing bottom 13 and possibly at least partially the front wall 19, and the top shell 21 has the wing roof 12 and possibly a rear wall 19', and each extend into the joining surface 17. Parts 15 and 16 are preferably fastened to one another by a snap-in or clip-type connection, and they abut one another in the joining surface 17, optionally, in an unconnected manner. Preferably, the snap-in or clip-type connection is provided inside the hollow body and adjacent to the joining surface 17 at several points.

The reinforcing structure 14 has several upright webs projecting into the hollow body 11, of which at least one web is oriented as a cross web 22 extending in the transverse direction FQ of the vehicle, and other webs are oriented as longitudinal webs 23 extending in the longitudinal direction FL of the vehicle. Another cross web 24—viewed in the driving direction FR—is arranged at a distance behind the forward cross web 22. The longitudinal webs 23 extend between the two cross webs 22 and 24, so that the web surface 25 of the forward cross web 22 facing the section 18 has a webless construction and is therefore plane or smooth and, in addition, faces the section 18 of the joining surface 17. The longitudinal webs 23 therefore extend between the rear side 25' of the cross web 22 facing away from the plane web surface 25 and the additional cross web 24 situated behind it, at whose rear wide 25' the longitudinal webs 23 may be continued. At least the forward cross web 22 of the reinforcing structure 14 is tightly connected with the interior surface 26 of the wing bottom 13, and the cross web 22 and the interior surface 26 form walls 27 of a water channel 28 which may extend in the transverse direction FQ of the vehicle over essentially the width of the rear wing 7. The interior surface 26 is preferably inclined against the driving direction FR or slopes downward in the direction of the web surface 25 and thereby encloses an angle with a horizontal line which is not shown, so that the water channel 28 may have an approximately V-shaped cross-section.

FIG. 3 only shows one half of the rear wing 7 which is therefore symmetrical with respect to a mirror axis 29 extending in the longitudinal direction FL of the vehicle. At least one opening 30, which completely penetrates the wing bottom 13 and thus forms a water drainage opening, is situated in the course of the water channel 28. Viewed in the transverse direction FQ of the vehicle, approximately in the center of the rear wing 7, the cross web 22 is set back against the driving direction FR in a first area 31 by way of step 32, so that a first bowl-type collecting section 33 of the water channel 28 is constructed in which the opening 30 is situated, preferably adjacent to the web surface 25.

In a second area 34 situated at a lateral distance from the first area 31, the cross web 22 is set back against the driving direction FR, so that a second bowl-type collecting section 35 of the water channel 28 is arranged at the lateral end 36 of the rear wing 7, which collecting section 35 has a step 32 and an adjoining set-back collecting bend 37. Viewed in the driving direction FR, the collecting bend 37 extends around a ring collar 38 situated in front of it and continues the cross web 22 to the forward section 18 of the joining surface 17, so that a web end 39 is situated adjacent to the section 18 or extends to it. The ring collar 38 forms a continuation of the support 10 situated inside the rear wing 7, which support 10 is otherwise situated outside the hollow body 11 and can receive in its interior the above-mentioned but not shown tilt-out device for the rear wing 7. The ring collar 38 starts out from the interior surface 26 of the bottom shell 20 and prevents that water can reach the interior 40 of the support 10. At least one opening 30 is arranged in one or both collecting sections 33 and 35 respectively. The lower shell 20 with the reinforcing structure 14 and optionally with the support 10 can be produced as a one-part component, particularly made of plastic.

In order to be able to advantageously deflect the water which may enter at the joining surface 17 in the section 18, the cross web 22 slopes downward at least in a web section 41 toward at least one of the collecting sections 33 or 35. In the illustrated embodiment, this web section 41 is situated between the two steps 32 and—starting from the step 32 of the second collecting section 35—slopes downward in the direction of the central first collecting section 33 toward its step 32.

Figure 5:
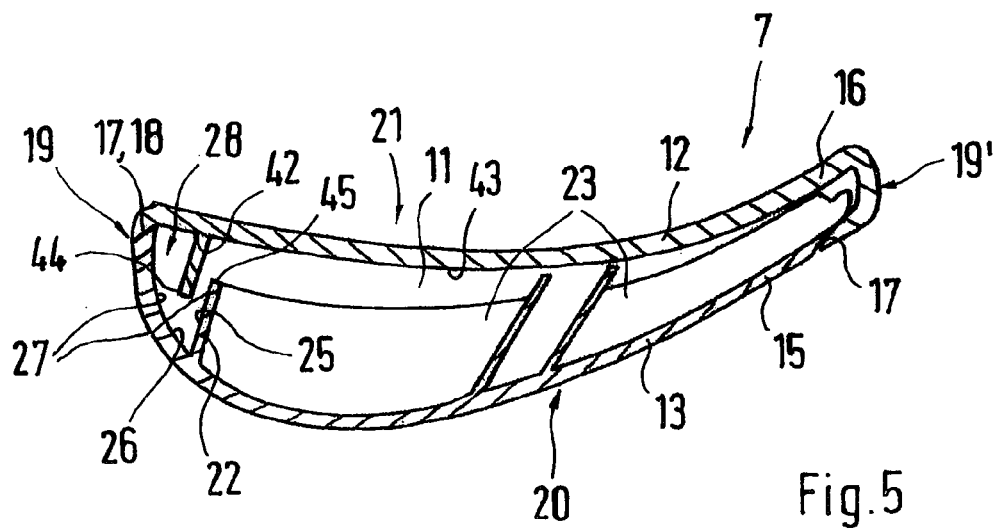
FIG. 5 is a sectional view of the rear wing along the section Line V—V in FIG. 3.

The sectional view of the rear wing 7 according to FIG. 5 also shows a water deflecting web 42 on the part 16 or on the upper shell 21, which water deflecting web 42—viewed in the driving direction FR—is disposed in front of the plane web surface 25, thus, is arranged upright between the section 18 of the joining surface 17 and the cross web 22. The water deflecting web 42 extends along the cross web 22 and optionally at least in sections parallel to the section 18 of the joining surface 17 and/or to the cross web 22; it preferably extends to the web end 39 and starts from the wing roof underside 43 and in the process points in the direction of the wing bottom 13. In addition—viewed in the driving direction FR—the water deflecting web 42 may be situated at a distance from the cross web 22 or be placed against it. The height of the water deflecting web 42, which may optionally be implemented in one piece with the upper shell 21—produced, for example, of a plastic material—, is preferably dimensioned such that its free end 44 projects into the water channel 28; thus, is situated with its end 44 below the free end 45 of the cross web 22 but ends at a distance from the interior surface 26. Thus, the water deflecting web 42 forms a barrier for water which may enter at the section 18 and which drips from the water deflecting web 42 into the water channel 28. The water deflecting web 42 and the cross web 22 therefore form a labyrinth-type sealing device which prevents and/or at least reduces an advancing of water to behind the cross web 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Rear wing for a motor vehicle, comprising:
   a hollow body assembled of at least two parts having a wing roof and a wing bottom,
   a reinforcing structure arranged inside the hollow body and having several upright webs, of which at least one cross web extending in a transverse direction of the vehicle is connected with an interior surface of the wing bottom, and
   at least one opening provided in the wing bottom,
   wherein the at least one cross web has a web surface which forms a wall of a water channel, and
   wherein the at least one opening is situated in the course of the water channel.

2. Rear wing according to claim 1, wherein the water channel is formed by the web surface together with the interior surface of the wing bottom.

3. Rear wing according to claim 1, wherein one part of the hollow body forms a lower shell and the other part forms an upper shell.

4. Rear wing according to claim 1, wherein a forward section of a joining surface of the two parts is situated—viewed in the driving direction—on a forward front side of the rear wing.

5. Rear wing according to claim 4, wherein the web surface faces the forward section of the joining surface.

6. Rear wing according to claim 1, wherein an upright ring collar is arranged on the interior surface, to which ring collar a support is assigned for the rear wing.

7. Rear wing according to claim 1, wherein, viewed in the driving direction, the cross web is set back in at least one area and thus forms at least one collecting section of the water channel.

8. Rear wing according to claim 7, wherein, viewed in the transverse direction of the vehicle, a first collecting section is situated approximately in the center of the rear wing.

9. Rear wing according to claim 8, wherein, viewed in the driving direction, a second collecting section extends around a ring collar in a collecting bend.

10. Rear wing according to claim 7, wherein the at least one opening is situated in the at least one collecting section.

11. Rear wing according to claim 4, wherein a web end of the cross web is situated adjacent to the forward section of the joining surface.

12. Rear wing according to claim 9, wherein the set-back second collecting section is continued to the web end of the cross web.

13. Rear wing according to claim 7, wherein a web section of the cross web is constructed to slope downward in a direction of the at least one collecting section.

14. Rear wing according to claim 8, wherein a web section of the cross web slopes downward in a direction of the first collecting section.

15. Rear wing according to claim 14, wherein a step is situated between the web section and the set-back first collecting section.

16. Rear wing according to claim 1, wherein the reinforcing structure has several longitudinal webs which are situated on a rear side of the cross web facing away from the web surface.

17. Rear wing according to claim 1, wherein a water deflecting web originates from an underside of the wing roof, which water deflecting web is situated in front of the cross web, viewed in the driving direction.

18. Rear wing according to claim 17, wherein the water deflecting web projects into the water channel.

19. Rear wing according to claim 17, wherein the water deflecting web extends along the cross web.

20. A motor vehicle rear wing comprising:
a wing roof,
a wing bottom connected with the wing roof to form a hollow body,
a reinforcing structure arranged inside the hollow body, said reinforcing structure including a plurality of upright webs, one of said upright webs being a cross web extending in a transverse direction of a vehicle carrying the spoiler wing, said cross web being connected with an interior surface of the wing bottom, and
at least one water drainage opening in the wing bottom,
wherein the cross web has a web surface which forms a wall of a water channel, and
wherein the at least one water drainage opening is located in the water channel.

21. A motor vehicle rear wing according to claim 20, wherein the water channel is formed by the web surface together with the interior surface of the wing bottom.

22. A motor vehicle rear wing according to claim 20, wherein the wing roof and wing bottom are separate parts joined together along a joining surface.

23. A motor vehicle rear wing according to claim 22, wherein the web surface faces the forward section of the joining surface.

24. A motor vehicle rear wing according to claim 20, wherein an upright ring collar is arranged on the interior surface, to which ring collar a support is assigned for the rear wing.

25. A motor vehicle rear wing according to claim 20, wherein, viewed in the driving direction, the cross web is set back in at least one area and thus forms at least one collecting section of the water channel.

26. A motor vehicle rear wing according to claim 20, wherein three of said water drainage openings are disposed in the water channel.

27. A motor vehicle rear wing according to claim 20, wherein a water deflecting web originates from an underside of the wing roof, which water deflecting web is situated in front of the cross web, viewed in the driving direction.

28. A motor vehicle rear wing according to claim 27, wherein the water deflecting web projects into the water channel.

29. A method of making the motor vehicle rear wing of claim 20, comprising:
forming the wing roof as a single plastic part,
forming the wing bottom together with the cross web as a single plastic part, and
joining the wing roof and wing bottom along a joining surface.

30. A method according to claim 29, comprising forming a water deflecting web together with the wing roof, said water deflecting web being disposed in front of the cross web when the wing is disposed in use on a motor vehicle.

* * * * *